[19] United States Patent
Summers

[11] Patent Number: 4,817,640
[45] Date of Patent: Apr. 4, 1989

[54] HERBAL CHEW AND SNUFF COMPOSITIONS

[75] Inventor: John K. Summers, Anderson, Ind.

[73] Assignee: Better Life International Life, Inc., Stuart, Fla.

[21] Appl. No.: 907,402

[22] Filed: Sep. 12, 1986

[51] Int. Cl.⁴ .............................................. A24B 15/18
[52] U.S. Cl. .................................... 131/359; 131/352; 131/369
[58] Field of Search ................................ 131/359, 369

[56] References Cited

U.S. PATENT DOCUMENTS

| | | |
|---|---|---|
| 92,497 | 7/1860 | Webster . |
| 107,693 | 9/1879 | Kilbourn . |
| 111,711 | 2/1871 | Wright . |
| 160,138 | 2/1875 | Appleby . |
| 166,155 | 7/1875 | Sterry . |
| 210,538 | 12/1878 | James . |
| 448,925 | 3/1891 | Miller . |
| 2,298,532 | 10/1941 | Franich . |
| 2,930,720 | 3/1960 | Finberg ............................ 131/359 |
| 3,067,068 | 12/1962 | Finberg . |
| 3,369,551 | 2/1968 | Carrall ............................ 131/359 |
| 3,747,607 | 7/1973 | Kim .................................... 131/359 |

FOREIGN PATENT DOCUMENTS 842 of 1776 United Kingdom .
2427 of 1859 United Kingdom .
981137 1/1965 United Kingdom .

OTHER PUBLICATIONS

"Herbal Smoking Substitutes for Tobacco," pp. 141–150, year and author unknown.

*Primary Examiner*—V. Millin
*Assistant Examiner*—J. Cheng
*Attorney, Agent, or Firm*—Hoffmann & Baron

[57] ABSTRACT

Compositions and methods for providing tobaccoless herbal chew and snuff products which include an herbal component capable of being encased with a casing material providing a coherent cud in the oral cavity during use. In particular the present invention contemplates the use of a nicotine-free herbal substitute, such as red clover in the case of snuff and dandelion leaf in the case of chew, which can be encased with, among other things, a binder to provide a coherent cud in the mouth during use. As a result of this invention, safe nicotine-free snuff and chew compositions can be provided.

39 Claims, No Drawings

HERBAL CHEW AND SNUFF COMPOSITIONS

This application is a continuation-in-part of application Ser. No. 777,614 filed Sept. 19, 1985 now U.S. Pat. No. 4,696,315.

BACKGROUND OF THE INVENTION

The present relates to simulated tobacco snuff and chew compositions which can be made from known herbs and combinations thereof, which, in their use, proximate the texture, taste, and organoleptic sensation of a snuff or a chew composition. The present application is a continuation in part application of U.S. application Ser. No. 777,614 filed Sept. 19, 1985, which has been allowed and will issue as U.S. Pat. No. 4,696,315 on September 1987. The contents of the parent case are incorporated herein by reference.

The Surgeon General of the United States has determined tobacco as dangerous to physical health. Accordingly, the tobacco industry has made diligent efforts to minimize the danger of tobacco use by minimizing the amount of harmful nicotine contained in the tobacco.

Merely decreasing the amount of nicotine, however, has generally been recognized as inadequate as evidence by the disclosure of U.S. Pat. Nos. 2,930,720 and 3,007,068, both to Finberg, which are directed to smoking and snuff compositions which are substantially nicotine-free. Both of these disclosures include as essential components non-tobacco leaves, namely papaya leaves. Other patents relating to the nicotine problem include U.S. Pat. Nos. 3,112,754, and 3,323,524, as well as British Pat. No. 842 grantedin 1766. Further patents disclosing certain features of interest are U.S. Pat. Nos. 160,138 and 3,112,754, as well as British Pat. No. 2427 granted in 1859.

More particularly, in recent times it has also been found that chewing tobacco and/or nicotine-containing substances can have a further more serious effect, such as cancer of the mouth.

In the above-identified parent application compositions for health-oriented snuff and chew compositions were disclosed. Since that time it has been found appropriate to extend the work in this area to appeal to as wide a variety of chew and snuff users as possible. Consequently, the present invention has been developed as a result of such further activity.

As in the previous case. it is an object of the present invention to provide an alternative snuff composition which can be made without a nicotine-containing substance such as tobacco.

Another object of the invention is to provide an alternative chew composition which can be made without a nicotine-containing substance such as tobacco.

Yet another object of the present invention is to provide a tobaccoless chewing substance which has a consistency, taste and the organoleptic qualities of a tobacco chewing composition.

Furthermore, it is an object of the present invention to provide a tobaccoless snuff substance which has a consistency, taste, and the organoleptic qualities of a tobacco snuff composition.

A further object of the present invention is to provide tobaccoless compositions for chewing and snuff which can be included with a tobacco component thereof so that the nicotine content of the overall composition can be reduced in comparison to an all tobacco-containing product.

It is still a further object of the invention to provide chew and snuff compositions free of artificial chemicals, while at the same time exhibiting the same texture, taste, bite and lift as fine-quality tobacco snuff and chew products.

Still another object of the invention is to provide tobaccoless chew compositions which do not necessitate expectorating.

Another object of the invention is to provide compositions including a herb-induced salivation.

Still other objects of the invention will be readily apparent to those skilled in the art of chewing and snuff compositions in view of the following detailed description of the invention.

SUMMARY OF THE INVENTION

In the present invention, compositions and methods have been provided for a safe, nicotine-free chewing and snuff products including a herbal component capable of being encased and also capable of being processed to a texture which is non-injurious to the surface of the oral cavity. The invention also includes a casing material for combining with the herb so that it maintains it in a moist coherent cud in the oral cavity during use. Usually, the herb is hydrophilic whereas the casing is absorptive to the herb so that it can be readily combined therewith.

In the case of a chewing composition, the herb can be selected from a group consisting of dandelion, papaya, dock or sorrel, sunflower, calendula, nasturtium, mallow, chicory, corn silk and mixtures thereof. In the case of snuff composition, the above herbs can be used, and in addition clover can be used, red clover being the present preferred major component of the snuff composition. In the case of the chew composition, it has been found that a combination of dandelion and dock or sorrel provides an especially good product.

The casing material which is combined with the herbal component in both the chew composition and the snuff composition, should preferably contain a preservative, a binder, and a humectant.

The preservative is used to insure that the product is not contaminated, and can include an ingredient, such as salt, and herbal ingredients, such as powdered dandelion root, echinacea, clove powder and mixtures thereof.

The binder component is generally used to provide coherency, and can be selected from the group consisting of molasses, corn syrup, hydrogenated starch hydrolysates and mixtures thereof. A typical starch hydrolysate is Lycasin (a trademark of Roquette Corp.). The humectant component which is used to maintain moistness of the composition, can include ingredients such as glycerin, sorbitol, invert sugar and other moisture-maintaining materials.

In order to enhance the consumer acceptability of the product, both the chewing and the snuff compositions can include a flavor component, which can be selected from the group consisting of natural and artificial sweeteners, flavoring agents, fruit flavors, spices, and mixtures thereof.

The natural sweeteners are well known, and the artificial sweeteners can include, but are not limited to, solid natural or synthetic sweeteners such as amino acid based sweeteners, dipeptide sweeteners, especially aspartane, glycerin, saccharine and its salts, acesulfame salts, cyclamates, steviosides, talin, dihydrochalcone compounds and mixtures thereof.

Flavoring agents useful in the present invention includes synthetic solid flavoring agents and/or liquids derived from plants, leaves, flowers, fruits and so forth in combinations thereof. Representative flavoring liquids include: spearmint oil, cinnamon oil, oil of wintergreen (methyl salycilate) and peppermint oils. Also, artificial natural synthetic fruit flavors such as citric oils including lemon, orange, grape, lime and grapefruit and fruit essences including apple, strawberry, cherry, pineapple, can be used.

The color components for use in the present compositions can be selected from any food grade color, except, such as carmel, etc.

When the present invention is applied to provide a chewing composition including flavoring and coloring, it is contemplated that the herb component is present in the composition of the final product in an amount of from about 40% to about 60% by weight, preferably from about 45% to 55% by weight, whereas the casing component can be present in an amount of from about 8 to about 35% by weight, and is preferably present in an amount of from about 15 to 28% by weight. In this chewing composition, the flavor component can be present in an amount of from about 4 to about 26% by weight, and is preferably from about 8 to about 20% by weight, while the color component can be present in an amount of from about 0.25 to about 5% by weight, and is preferably present in an amount of from about 0.8 to about 3% by weight.

In the case of a snuff composition, the herb component is present in a final product in an amount of from about 25% to about 45% by weight, preferably from about 30% to about 40% by weight, and most preferably in an amount of from about 32% to about 37% by weight, and the casing component is present in an amount of from about 35% to 60% by weight, preferably from about 40% to about 60% by weight, and most preferably from about 45% to about 55% by weight.

Furthermore, the snuff composition can also have a flavorant component, a color component, and an additional non-casing herbal binder component which can, for example, have an ingredient such as gums, slippery elm, mallow, and mixtures thereof. When the additional components are included in the snuff, the flavor component is present in an amount of from about 0.25% to about 7%, preferably from about 1.2% to about 5%, and most preferably from about 2.5% to about 4% by weight, while the color component is present in an amount of from about 0.25% to about 5% by weight, preferably from about 0.8% to about 3% by weight, and preferably from about 1.0% to about 1.8% by weight. Finally, the additional binder component can be present in an amount of from about 0.5% to about 5% by weight, preferably from about 0.8% to about 3% by weight, and most preferably from about 0.1% to about 2% by weight.

Moreover, when preparing the compositions of the present invention, there can also be included a bio-effecting agent. These bio-effecting agents can be almost any agent which is compatible with the particular composition and which can be delivered by a suitable carrier. In general, the bio-effecting agents can be selected from the group consisting of mineral supplements, analgesics, antipyretics, antiarrhythmics, ion exchange resins, appetite suppressants, vitamins, anti-inflammatory substances, coronary dilators, cerebral dilators, peripheral vasodilators, anti-infectives, psychotropics, antimanics, stimulants, antihistamines, laxatives, decongestants, gastro-intestinal sedatives, antidiarrheal preparations, anti-anginal drugs, vasodilators, antihypertensive drugs, vasconstrictors and migrane treatments, antibiotics, tranquilizers, antipsychotics, antitumor drugs, anti-coagulants and antithrombotic drugs, hypnotics, sedatives, anti-emetics, anti-nauseants, anti-convulsants, neuro-muscular drugs, hyper and hypoglycaemic agents, thyroid and antithyroid preparations, diuretics, antispasmodics, uterine relaxants, nutritional additives, antiobestiy drugs, anabolic drugs, erythropoietic drugs, antiasthmatics, expectorants, cough suppressants, mucolytics, anti-uricemic drugs and mixtures thereof.

The present invention also includes method for preparations of both the chewing composition and the snuff composition. In particular, it has been found that the chewing composition can be made by providing a substantially leafy herbal medium, moisturizing the herbal medium with the casing material, steaming the encased herbal medium and then dehydrating by, for example, drying by one form or another, preferably until the moisture level is from about 19% to 21%. Furthermore it is preferred that in preparation of the chewing composition the moistened steam product be aged to darken it to the appropriate color, and to add flavoring by additional steps included within the process. Furthermore, the chewing composition can also be cut to a desired consistency, which, in the case of the use of dandelion in combination with dock or sorrel, has been found to be about 2 inches in length.

In the case of snuff composition it has been found useful to provide a herbal medium and a texture which is sufficient to provide the snuff consistency and admixing the casing material in order to encase the herbal medium. In order to facilitate this process, it has been found extremely useful to provide a distributor agent and to premix dry material with the distributor agent before subsequently admixing to the herbal medium. In the case of using red clover, a preferred embodiment of the snuff composition, a suitable distributor has been found to be red clover powder which is premixed with the dry material prior to the subsequent mixing step with the herbal medium.

As a result of the present invention, it is possible to provide a biologically safe, attractive, and organoleptically pleasing product as a tobaccoless, nicotine-free, chew or snuff composition.

Furthermore, it has also been found that as a result of the present invention not only are the detrimental effects of a nicotine-containing product overcome, but physiologically beneficial side effects are a direct result of the use of the new compositions.

For a better understanding of the present invention together with other and further objects, reference is made to the following description, and the scope of the invention will be pointed out in the appended claims.

DETAILED DESCRIPTION OF THE INVENTION

HERBAL CHEW COMPOSITION

The present invention includes a tobaccoless, nicotine-free, herbal chewing composition which is capable of forming a coherent cud in the oral cavity during chewing. In the case of the chewing composition, the range of components of the present invention are shown in the following table.

TABLE I
GENERAL FORMULA FOR CHEWING COMPOSITION

| Ingredient | % By Weight of Final Product |
| --- | --- |
| Nicotine-free Leafy Herb | 40 to 60 |
| Casing Material for Maintaining Herb in Coherent Cud | 8 to 50 |

Preferably, however, the chewing composition also includes addition components such as flavorant and coloring to provide an attractive appearance and enhance the organoleptic acceptability of the product. The preferred general formula is shown below in Table II.

TABLE II
PREFERRED GENERAL FORMULA FOR CHEWING COMPOSITION

| Ingredient | % By Weight |
| --- | --- |
| Nicotine-free leafy herb | 40.00 to 60.0 |
| Casing material for maintaining herb in coherent cud | 8.00 to 35.0 |
| Flavor component | 4.00 to 26.0 |
| Color component | 0.25 to 5.0 |

In order to prepare a chewing product for ready use by the consumer which can be sustained over a period of time the most preferred embodiment is shown below in Table III.

TABLE III
MOST PREFERRED GENERAL FORMULA FOR CHEWING COMPOSITION

| Ingredient | % By Weight |
| --- | --- |
| Nicotine-free leafy herb | 45.00 to 55.0 |
| Casing material for maintaining herb in coherent cud | 15.00 to 28.0 |
| Flavor component | 8.00 to 20.0 |
| Color component | 0.80 to 3.0 |

The casing material, in turn, should include those components which provide a moist coherent cud in the mouth during chewing. It has been found that a suitable casing component can be provided by use of three major functional components, a preservative, a binder and a humectant. The preservative can be one or more components which can include a salt, powdered dandelion root, echinacea, clove powder and mixtures thereof. The binder material can include molasses, corn syrup, hydrogenated starch hydrolysates, and mixtures thereof. The humectant can be selected from one of glycerin, sorbitol, invert sugars, and other moisture-maintaining materials.

EXAMPLE 1

A chew formula was prepared using the following formula:

TABLE IV
CHEW FORMULA FOR EXAMPLE 1

| Ingredient | Weight in Grams | % By Weight |
| --- | --- | --- |
| Herbal Component | | |
| Dandelion leaves | 235 | 62.6 |
| Casing Component | | |
| Sea Salt Powder | 25 | 6.6 |
| Glycerine | 10 | 2.7 |
| Water | 80 | 21.3 |
| Molasses | 15 | 4.0 |
| Colorant | | |
| Caramel Darkener | 10 | 2.7 |
| Flavorant | | |
| Jamaican Ginger Powder | 0.5 | 0.1 |
| | | 100 |

Using the above formula, the molasses, water, salt and caramel darkener are premixed, and then added to the dandelion leaves by moistening the leaves evenly with a mist provided in a tumble blender. The moistened leaves are then steamed for about 5 to 8 minutes under atmospheric pressure until the moisture content is from about 22% to about 30%. At this point in the procedure, the steamed leaves can be cut to a desired size, such as about two inches in length in the case of dandelion leaves by use of an appropriate cutting machine.

The moistened and steamed leaves were then bulked to darken the leaves to the desired texture. The leaves were bulked overnight, but can be bulked for one to three days in containers, such as plastic bags, in order to attain the appropriate darkness.

As previously indicated, the leaves can then be further flavored, and, in the present example, were flavored by dipping the leaves into a heated flavoring composition of choice at a temperature of about 140° for approximately three minutes, followed by wringing the leaves out to a moisture content of 33% to 35%. The leaves were again bulked by holding in containers for about one day.

A further flavoring step was performed by sprinkling a powder flavorant over the leaves at a rate of 25 grams per pound of encased leaves. This was performed in a tumble blender so that the powder flavorant could be spread evenly over the leaves. The leaves were again bulked for about one day before the next step. The encased leaves were then dehydrated by drying in a tumble dryer at about 145° F. until a moisture content of 19 to 21% was attained. Then, additional aromatics, in combination with caramel coloring was sprayed on the leaves during the tumble drying at a rate of 27 grams of flavoring and 5 grams of darkener for each 480 grams of encased leaves, until a moisture content of 19 to 21% was again attained.

The product resulting from the above procedure was an attractive, fluffed, leafy aromatic product. Referring to the above procedure, it is also contemplated that the cutting operation can take place at any time after or during the flavoring procedure.

HERBAL SNUFF COMPOSITION

Turning now to the snuff composition of the present invention, it is contemplated that a suitable composition can be prepared in accordance with the following formula:

TABLE V

| Ingredient | % By Weight |
| --- | --- |
| Nicotine-free herbal component | 25 to 45 |
| Casing Component | 35 to 65 |

A preferred formula for the snuff composition can be prepared in accordance with the ranges shown in Table VI.

TABLE VI

| Ingredient | % By Weight |
| --- | --- |
| Nicotine-free herbal component | 30 to 40 |
| Casing component | 40 to 60 |

Furthermore, the most preferred embodiment of the snuff composition can be prepared in accordance with the following general formula:

MOST PREFERRED HERBAL SNUFF COMPOSITION

| Ingredient | % By Weight |
| --- | --- |
| Nicotine-free herbal component | 32 TO 37 |
| Casing component | 45 to 55 |

The snuff composition can also include, as in the case of the chewing composition, a flavorant component, a color component, and an additional non-casing herbal binder component. When these additional components are used they can be provided in the following percentages.

| Ingredient | General % By Weight | Preferred % By Weight | Most Preferred % By Weight |
| --- | --- | --- | --- |
| Flavor component | 0.25 to 7 | 1.2 to 5 | 2.25 to 4 |
| Color component | 0.25 to 5 | 0.8 to 3 | 1.0 to 1.8 |
| Herbal binder | 0.5 to 5 | 0.8 to 3 | 0.1 to 2 |

Actual examples of the snuff composition have been prepared using the above general formulas, as set forth below:

EXAMPLE II

A snuff composition was prepared as a substitute nicotine-free herbal composition in accordance with the following formula:

TABLE VII

| Ingredient | Weight in Grams | % By Weight |
| --- | --- | --- |
| Cut and sifted Red Clover | 150.9 | 32.7 |
| Casing | | |
| Barbados Molasses | 197.42 | 42.7 |
| Glycerine | 15.35 | 3.3 |
| Salt | 20.76 | 4.5 |
| Sodium Bicarbonate | 20.11 | 4.4 |
| Water | 16.52 | 3.6 |
| Flavorant | | |
| Cayenne | 7.4 | 1.6 |
| Ammonium Chloride | 9.91 | 2.1 |
| Combination flavorings | 3.31 | .7 |
| Colorant | | |
| Caramel | 5.01 | 1.1 |
| Herbal binder | | |
| Powdered marshmallow root | 4.2 | .9 |
| Acachia gum powder | 1.24 | 0.3 |
| Distributor | | |
| Powdered red clover | 10 | 2.2 |

First of all, certain of the dry components were premixed with the red clover powder as an interface for effective distribution with the herbal red clover cut and sifted. In particular, approximately one-half of the total amount of cayenne, the powdered marshmallow root, and powdered acachia gum were blended with the powdered red clover and then the premix was distributed evenly in the cut and sifted red clover by blending.

In order to prepare the casing, the molasses were warmed to approximately 100° to 120° F. prior to mixing and then the distilled water and glycerine were thoroughly mixed therewith by blending for approximately two minutes. The salt, sodium bicarbonate and ammonium chloride were then grounded and sifted and immediately introduced into the liquid casing mixture whereupon the casing mixture turned from a very dark brown to a lighter chocolate color and a foamy consistency. This is a heavy liquid which was then dispensed into a ribbon blender, i.e., a tumbler with a ribbon blade for blending in wich the red clover was being tumbled and continued for approximately five minutes.

Once this material was sufficiently combined with the red clover, flavoring, e.g., the combined flavoring material of choice along with the balance of the cayenne which had been premixed, was sprayed on the admixed red clover for about two minutes. The entire combination was then bulked for about 4 days before packaging.

The snuff which resulted from the above procedure was a thoroughly mixed fine-textured product which closely approximates the snuff prepared from normal tobacco leaves.

EXAMPLE III

Another snuff composition was prepared as in the procedure forth above, but using the following formulation.

| Ingredient | Weight in Grams | % By Weight |
| --- | --- | --- |
| Cut and sifted Red Clover | 147.9 | 30.2 |
| Casing | | |
| Barbados Molasses | 197.42 | 40.4 |
| Glycerine | 15.35 | 3.1 |
| Water | 16.52 | 3.4 |
| Salt | 20.76 | 4.2 |
| Sodium Bicarbonate | 20.11 | 4.1 |
| Water | 16.52 | 3.4 |
| Flavorant | | |
| Cayenne | 6.5 | 1.3 |
| Ammonium Chloride | 9.91 | 2.0 |
| Combination flavorings | 17.67 | 3.6 |
| Colorant | | |
| Caramel | 5.01 | 1.0 |
| Herbal binder | | |
| Powdered marshmallow root | 4.2 | .9 |
| Acachia gum powder | 1.24 | 0.3 |
| Distributor | | |
| Powdered red clover | 10 | 2.0 |

The resulting produce was a even-textured light snuff composition which provided good coherency and binding as well as excellent flavor during the use.

Thus, while there have been described what are presently believed to be the preferred embodiments of the invention, those skilled in the art will realize that changes and modifications may be made thereto without departing from the spirit of the invention and it is intended to claim all such changes and modifications as fall within the true scope of the invention.

I claim:

1. A chewing composition comprising a nicotine-free herb containing essential oils capable of being encased and capable of being processed to a texture which is non-injurious to the surface of the oral cavity, said herb is a mixture of dandelion, and dock or sorrel and a casing material absorptive to said herb which includes a preservative, a binder, and a humectant for combining with said essential oil-containing herb which maintains said herb in a moist coherent cud during chewing.

2. The chewing composition of claim 1 which further comprises a flavorant and a coloring agent.

3. The chewing composition of claim 2 wherein said flavor component is selected from the group consisting of natural and artificial sweeteners, flavoring agents, spices, fruit flavors, and mixtures thereof.

4. The chewing composition of claim 2 wherein said color component is selected from the group consisting of carmel and other food grade coloring agents.

5. The chewing composition of claim 2 wherein said herb component is present in the composition of the final product in an amount of from about 40% to about 60% by weight, said casing component is present in an amount of from about 8% to about 35% by weight, said flavor component is present in an amount from about 4% to about 26% by weight, and said color component is present in an amount of from about 0.25% to about 5% by weight.

6. The chewing composition of claim 5 wherein said herb component is present in an amount of about 45% to about 55% by weight, said casing component is present in an amount of from about 15% to about 28% by weight, said flavor component is present in an amount of about 8% to about 20% by weight, and said color component is present in an amount of about 0.8% to about 3.0% by weight.

7. The chewing composition of claim 1 wherein said preservative is selected from the group consisting of a salt, powdered dandelion root, echinacea, clover powder, and mixtures thereof.

8. The chewing composition of claim 1 wherein said binder is selected from a group consisting of molasses, corn syrup, hydrogenated starch hydrolysates, and mixtures thereof.

9. The chewing composition of claim 1 wherein said humectant is selected from the group consisting of glycerin, sorbitol, invert sugar, and other moisture-maintaining materials.

10. The chewing composition of claim 1 which further comprises a bio-effecting agent.

11. The chewing composition of claim 10 wherein said bio-effecting agent is selected from the group consisting of mineral supplements, analgesics, antipyretics, antiarrhythmics, ion exchange resins, appetite suppressants, vitamins, anti-inflammatory substances, coronary dilators, cerebral dilators, peripheral vasodilators, anti-infectives, psychotropics, antimanics, stimulants, antihistamines, laxatives, decongestants, gastro-intestinal sedatives, antidiarrheal preparations, anti-anginal drugs, vasodilators, anti-hypertensive drugs, vasoconstrictors and migrane treatments, antibiotics, tranquilizers, antipsychotics, antitumor drugs, anticoagulants and antithrombotic drugs, hypnotics, sedatives, anti-emetics, anti-nauseants, anticonvulsants, neuromuscular drugs, hyper and hypoglycaemic agents, thyroid and antithyroid preparations, diuretics, antispasmodics, uterine relaxants, nutritional additives, antiobesity drugs, anabolic drugs, erythropoietic drugs, antiasthmatics, expectorants, cough suppressants, nucolytics, antiuricemic drugs and mixtures thereof.

12. A snuff composition comprising a nicotine-free herb containing essential oils capable of being encased and capable of being processed to a texture which is non-injurious to the surface of the oral cavity, said herb being clover, and a casing material which includes a preservative, a binder, and a humectant for combining with said essential oil-containing herb which maintains said herb in a moist coherent cud in the mouth during use.

13. The snuff composition of claim 12 wherein said herb is hydrophilic and wherein said casing is adsorptive to said herb.

14. The snuff composition of claim 13 wherein said herb is red clover.

15. The snuff composition of claim 12 wherein said herb component is present in the final product in an amount of from about 25% to about 45% by weight, and said casing component is present in an amount of from about 35% to about 65% by weight.

16. The snuff composition of claim 15 wherein said herb component is present in an amount of from about 30% to about 40%, and said casing component is present in an amount of from about 40% to about 60%.

17. The snuff composition of claim 16 wherein said herb component is present in an amount of from about 32% to about 37% by weight, and said casing component is present in an amount of from about 45% to about 55% by weight.

18. The snuff composition of claim 12 wherein said preservative is selected from the group consisting of a salt, powdered dandelion root, echinacea, clove powder and mixtures thereof.

19. The snuff composition of claim 12 wherein said binder is selected from the group consisting of molasses, corn syrup, hydrogenated starch hydrolysates and mixtures thereof.

20. The snuff composition of claim 12 wherein said humectant is selected from the group consisting of glycerin, sorbitol, invert sugar, and other moisture-maintaining materials.

21. The snuff composition of claim 12 which further comprising a flavorant component, a color component, and an additional non-casing herbal binder component.

22. The snuff of claim 21 wherein said flavor component is present in an amount of from about 0.25% to about 7% by weight, said color component is present in an amount of from about 0.25% to about 5% by weight, and said additional binder component is present in an amount of from about 0.5% to about 5% by weight.

23. The snuff composition of claim 22 wherein said flavor component is present in an amount of from about 1.2% to about 5% by weight, said color component is present in an amount of from about 0.8% to about 3% by weight, and said additional binder component is present in an amount of from about 0.8% to about 3% by weight.

24. The snuff composition of claim 23 wherein said flavor component is present in an amount of from about 2.5% to about 4% by weight, said color component is present in an amount of from about 1.0% to about 1.8% by weight, and said additional binder component is present in an amount of about from 0.1% to about 2.0% by weight.

25. The snuff composition of claim 21 wherein said herbal binder component comprises an ingredient selected from the group consisting of gums, slippery elm, mallow, and mixtures thereof.

26. The process of claim 25 wherein said final moisture level is from about 19% to about 21%.

27. The snuff composition of claim 21 wherein said flavor component is selected from the group consisting of natural and artificial sweeteners, flavor agents, fruit flavors, spices, and mixtures thereof.

28. The snuff composition of claim 21 wherein said color component contains ingredients selected from the group consisting of carmel, and food grade colorants.

29. The snuff composition of claim 12 which further comprises a bio-affecting agent.

30. The snuff composition of claim 29 wherein said bio-effecting agent is selected from the group consisting of mineral supplements, analgesics, antipyretics, antiarrhythmics, ion exchange resins, appetite suppressants, vitamins, anti-inflammatory substances, coronary dilators, cerebral dilators, peripheral vasodilators, anti-infectives, psychotropics, antimanics, stimulants, antihistamines, laxatives, decongestants, gastro-intestinal sedatives, antidiarrheal preparations, anti-anginal drugs, vasodilators, anti-hypertensive drugs, vasoconstrictors and migrane treatments, antibiotics, tranquilizers, antipsychotics, antitumor drugs, anticoagulants and antithrombotic drugs, hypnotics, sedatives, anti-emetics, anti-nauseants, anticonvulsants, neuromuscular drugs, hyper and hypoglycaemic agents, thyroid and antithyroid preparations, diuretics, antispasmodics, uterine relaxants, nutritional additives, antiobesity drugs, anabolic drugs, erythropoietic drugs, antiasthmatics, expectorants, cough suppressants, mucolytics, anti-uricemic drugs and mixtures thereof.

31. A process for preparing a tobaccoless chewing composition comprising providing a substantially leafy medium capable of being encased and capable of being processed to a texture which is non-injurious to the surface of the oral cavity, moistening said herbal medium with a casing material which maintains said herb medium in a moist coherent cud durig chewing whereby said herbal medium becomes encased, steaming said encased herbal medium, aging said herbal medium in order to darken said moistened herbal medium to the desired shade, and dehydrating said steamed, moistened herbal medium until the moisture level is appropriate for providing a chewing composition.

32. The process of claim 31 wherein said aging comprises a bulking process in which said moistened, steamed herbal medium is stored in containers which permit the darkening of said medium.

33. The process of claim 31 which further comprises adding flavoring before and during dehydrating said leafy herbal medium.

34. The process of claim 33 wherein said flavor adding comprises immersion in a flavorant composition.

35. The process of claim 33 wherein said flavor adding step comprises addition of a flavor powder composition to said leafy medium.

36. The process of claim 33 wherein said flavor adding comprises spraying of a flavorant on said leafy medium before and/or during said dehydrating step.

37. The process of claim 31 wherein said leafy medium is cut to the desired consistency after moistening.

38. The process of claim 37 wherein said desired consistency is a length of approximately 2 inches.

39. A process for preparing a tobaccoless herbal snuff composition comprising providing a herbal nicotine-free medium capable of being encased and capable of being processed to a snuff consistency which is non-injurious to the surface of the oral cavity, said herbal medium being red clover which is cut and sifted, premixing dry material which is to be included in said composition with a dry distributor for interfacing with said herbal nicotine-free herb, said distributor being powdered red clover, combining with said herbal medium a casing material which maintains said medium in a moist coherent cud in the mouth during use.

* * * * *